United States Patent
Williams et al.

(10) Patent No.: US 11,444,753 B1
(45) Date of Patent: Sep. 13, 2022

(54) PROTOCOL KEY NEGOTIATION

(71) Applicant: ISARA Corporation, Waterloo (CA)

(72) Inventors: Robert Williams, Milton (CA); Alexander Truskovsky, Waterloo (CA)

(73) Assignee: ISARA Corporation, Waterloo (CA)

( * ) Notice: Subject to any disclaimer, the term of this patent is extended or adjusted under 35 U.S.C. 154(b) by 0 days.

(21) Appl. No.: 17/690,202

(22) Filed: Mar. 9, 2022

Related U.S. Application Data (60) Provisional application No. 63/158,446, filed on Mar. 9, 2021.

(51) Int. Cl.
*H04L 9/08* (2006.01)
*H04L 9/14* (2006.01)

(52) U.S. Cl.
CPC .......... *H04L 9/0825* (2013.01); *H04L 9/0852* (2013.01); *H04L 9/14* (2013.01)

(58) Field of Classification Search
CPC ........ H04L 9/0825; H04L 9/0852; H04L 9/14
See application file for complete search history.

(56) References Cited

U.S. PATENT DOCUMENTS

| | | | |
|---|---|---|---|
| 7,457,946 B2 * | 11/2008 | Hind | H04L 63/029 713/153 |
| 9,306,913 B1 | 4/2016 | Volkov | |
| 9,432,189 B1 * | 8/2016 | Wu | H04L 9/0819 |
| 9,712,504 B2 | 7/2017 | Kurmala et al. | |
| 10,063,527 B2 * | 8/2018 | Wu | H04L 9/14 |
| 11,153,080 B1 * | 10/2021 | Nix | H04L 9/3247 |
| 2003/0079143 A1 * | 4/2003 | Mikel | H04L 9/3271 726/8 |
| 2003/0177396 A1 * | 9/2003 | Bartlett | H04L 69/163 726/15 |

(Continued)

OTHER PUBLICATIONS

"Commercial Solutions for Classified Program (CSfC)", https://www.nsa.gov/Resources/Commercial-Solutions-for-Classified-Program/, Jul. 26, 2019, 4 pgs.

(Continued)

*Primary Examiner* — Yonas A Bayou
(74) *Attorney, Agent, or Firm* — Henry Patent Law Firm PLLC (57) ABSTRACT

In some aspects, a cryptography method includes executing, by operation of a first computing device associated with a first entity, a first handshake process with a second entity according to a first handshake protocol to establish a first symmetric encryption key for a first encryption protocol; executing, by operation of the first computing device, a second handshake process with the second entity to establish a second symmetric encryption key for a second encryption protocol. Executing the second handshake process includes: generating second handshake data according to a second handshake protocol; encrypting the second handshake data using the first symmetric encryption key with the first encryption protocol; and sending the encrypted second handshake data to a second computing device associated with the second entity; and using the second symmetric encryption key and the second encryption protocol for single-encrypted communication over a communication channel between the first and second entities.

19 Claims, 5 Drawing Sheets

(56) References Cited

U.S. PATENT DOCUMENTS

| | | | |
|---|---|---|---|
| 2004/0078593 A1* | 4/2004 | Hind | H04L 63/029 |
| | | | 713/153 |
| 2010/0191856 A1* | 7/2010 | Gupta | H04L 61/4511 |
| | | | 709/228 |
| 2014/0298469 A1* | 10/2014 | Marion | H04L 63/1416 |
| | | | 726/23 |
| 2020/0314115 A1* | 10/2020 | Nabeesa | H04L 63/1408 |
| 2020/0374129 A1* | 11/2020 | Dilles | H04L 9/50 |
| 2021/0058242 A1* | 2/2021 | Donsomsakunkij | |
| | | | H04L 9/0827 |
| 2021/0083862 A1* | 3/2021 | Pointcheval | H04L 9/3271 |

OTHER PUBLICATIONS

"The Transport Layer Security (TLS) Protocol, Version 1.2", Network Working Group, RFC 5246, Aug. 2008, 105 pgs.
"Three-Way Handshake", ScienceDirect, 2012, 9 pgs.
WIPO, International Search Report and Written Opinion dated Jun. 15, 2022, in PCT/CA2022/050338, 7 pgs.

* cited by examiner

PROTOCOL KEY NEGOTIATION

CROSS-REFERENCE TO RELATED APPLICATIONS

This application claims priority to U.S. Provisional Application No. 63/158,446 filed on Mar. 9, 2021, and entitled "Protocol Key Negotiation." The above-referenced priority application is hereby incorporated by reference.

BACKGROUND

The following description relates to protocol key negotiation.

Cryptography systems are used to communicate securely over public channels. For example, some cryptography systems provide confidentiality by encrypting messages, and some cryptography systems provide authenticity through digital signatures. Some cryptography systems operate using public keys, private keys, and shared secrets.

DETAILED DESCRIPTION

Information Technology (IT) systems use cryptography to ensure confidentially of sensitive information. A number of encryption protocol standards, like Transport Layer Security (TLS), Internet Key Exchange/Internet Protocol Security (IKE/IPsec), and others have been developed and are used to secure everything from web traffic on the public Internet to corporate traffic between physically separated corporate locations to government traffic between government offices.

In some instances, IT systems use public-key cryptography systems to ensure confidentially of sensitive information. However, many public-key cryptography systems are known to be insecure against an attacker armed with a scalable quantum computer. For example, the Diffie-Hellman (DH), elliptic curve Diffie-Hellman (ECDH), and other key establishment protocols are vulnerable to certain types of attacks by quantum-enabled adversaries. The threat of quantum computers to public key cryptography can be mitigated by switching to other public key cryptosystems that are believed to be invulnerable to quantum attack. For example, lattice-based cryptosystems have been proposed as quantum-resistant replacements for certain RSA-based or ECC-based cryptosystems that are believed to be quantum-vulnerable. One type of cryptography system that is believed to be quantum-safe uses isogenies between supersingular elliptic curves. Specific examples of such isogeny-based cryptography systems that are believed to be quantum-safe include supersingular isogeny Diffie Hellman (SIDH) key agreement and supersingular isogeny key encapsulation (SIKE).

Some conventional encryption protocols aim to protect sensitive information exchanged during an encrypted communication session against a quantum-enabled adversary. In some of these conventional encryption protocols, the handshake portion of the primary encryption protocol is modified. While these conventional encryption protocols are efficient in terms of data throughput, they require the ability to modify the protocol implementation of a secure communication session (e.g., the handshake session of the protocol), which can be burdensome and impractical in most communication systems. In other conventional encryption protocols, double encryption is used to increase confidence in the security of the encryption used to protect sensitive information transmitted over a public channel against a quantum-enabled adversary. As an example, in double encryption, after completing the first handshake, the plaintext data is first encrypted using a first encryption protocol to produce an encrypted data stream. The entire encrypted data stream (and the preceding first handshake exchange) are then encrypted using a second, different encryption protocol to produce double-encrypted data. Double encryption is analogous to piping the handshake data and plaintext data in through a primary communications tunnel and piping the primary communications tunnel through a second communications tunnel. Conventional encryption protocols that utilize double encryption involve a tradeoff between enhanced security and a decrease in performance. For example, double encryption adds significant overhead, wastes processing power, and reduces data throughput. In instances where the decrease in data throughput with double encryption is not desirable, some communication devices may need to be upgraded with more power hardware to maintain the desired throughput.

In some aspects of what is described here, partial re-encryption protects quantum-vulnerable portions of an encrypted communication session with minimal to no impact on throughput. An encrypted communication session can include a handshake portion and a bulk encryption portion. Aspects of the present disclosure propose an encryption protocol that double encrypts the handshake portion of a primary encryption protocol, while leaving the bulk encryption portion singly encrypted. Aspects of the present disclosure provide one or more advantages and improvements over existing technologies. For example, the disclosed encryption protocols can offer the same level of protection as double encryption and almost the same data throughput efficiency as encryption protocols that only modify the handshake part of the primary encryption protocol. Furthermore, the proposed encryption protocols can be implemented with a negligible (almost imperceivable) delay at connection set up (e.g., during the handshake portion) and no performance impact during the bulk encryption portion.

Figure 1:
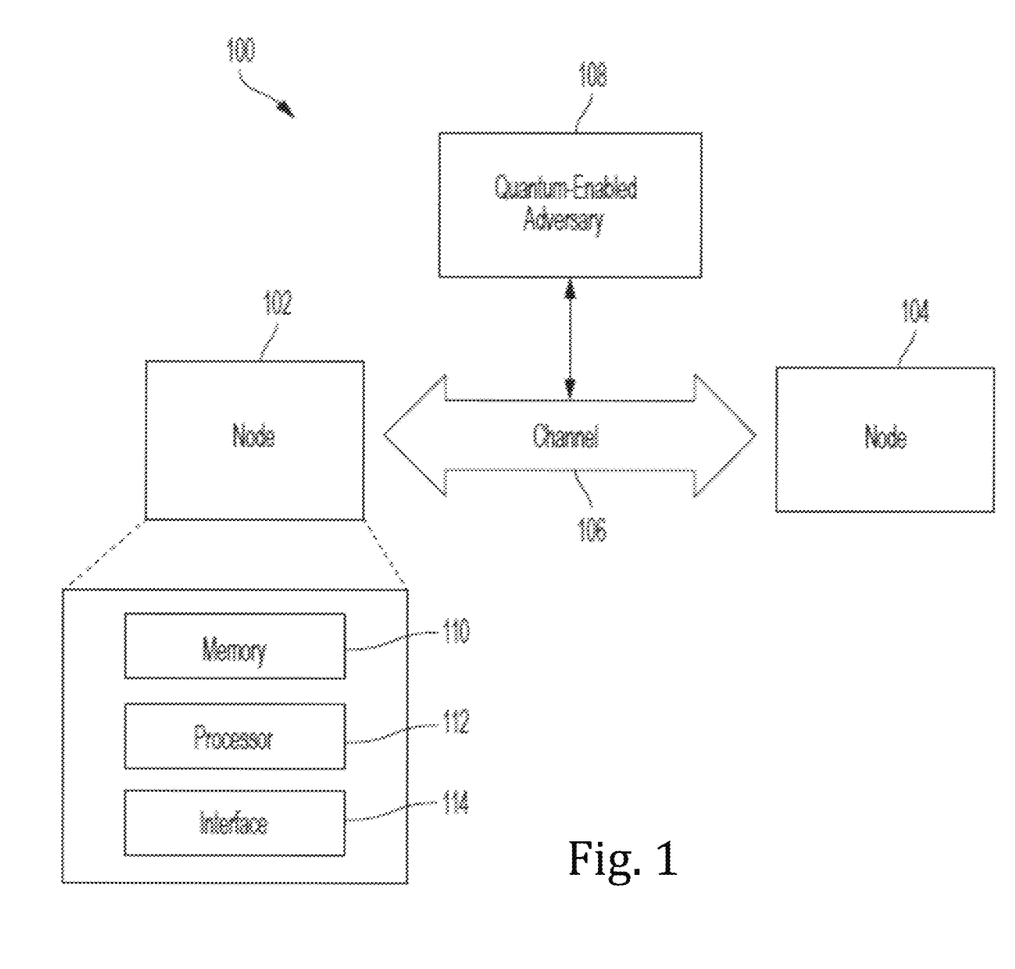
FIG. 1 is a block diagram showing aspects of an example communication system.

FIG. 1 is a block diagram showing aspects of an example communication system 100. The example communication system 100 shown in FIG. 1 includes two nodes 102, 104. The nodes 102, 104 communicate with each other over a channel 106. The nodes 102, 104 represent distinct entities in the cryptosystem.

In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network, or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, IoT devices, and other types of computer systems. As shown in FIG. 1, the example node 102 includes a memory 110, a processor 112, and an interface 114. Each of the nodes 102, 104 may include the same, additional, or different components. The nodes 102, 104 may be configured to operate as shown and described with respect to FIG. 1 or in another manner.

In the example shown in FIG. 1, the entities represented by the nodes 102, 104 may correspond to a computing device, a computer system, a MAC address, an IP address or other network address, or another type of computer-readable identifier or instance of a computer resource. Accordingly, the computations and other operations of each entity may be performed by one or more processors or other elements of the respective node 102, 104. Similarly, information sent to or received by an entity may be sent to or received by an element (e.g., one or more processors, memories, or interfaces) of the respective node 102, 104.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications, and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network, or in another manner). In some cases, the memory 110 stores computer-readable instructions for software applications, scripts, programs, functions, executables, or other modules that are interpreted or executed by the processor 112. For example, the computer-readable instructions can be configured to perform one or more of the operations shown in FIG. 5.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIG. 5.

The example processor 112 shown in FIG. 1 can include one or more chips or chipsets that include analog circuitry, digital circuitry, or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices, and possibly other components.

In the example node 102 shown in FIG. 1, the interface 114 provides communication with other nodes (e.g., via channel 106). In some cases, the interface 114 includes a wireless communication interface that provides wireless communication using a wireless protocol or standard. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks, or other communication channels. The channel 106 may have a spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range networks involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front-end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubit encodings. In some implementations, the quantum-enabled adversary 108 can operate in a fault-tolerant regime, or the quantum-enabled adversary may operate below the fault-tolerant regime.

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptography systems. For example, the quantum-enabled adversary 108 may be capable of computing prime factors (e.g., using Shor's factoring algorithm) fast enough to compromise certain RSA-based cryptography systems or computing discrete logarithms fast enough to compromise certain ECC-based cryptography systems. Accordingly, the example quantum-enabled adversary 108 can compromise the security of certain quantum-vulnerable cryptography systems (e.g., by computing a private key of a certificate authority or other entity based on public information).

Figure 2A:
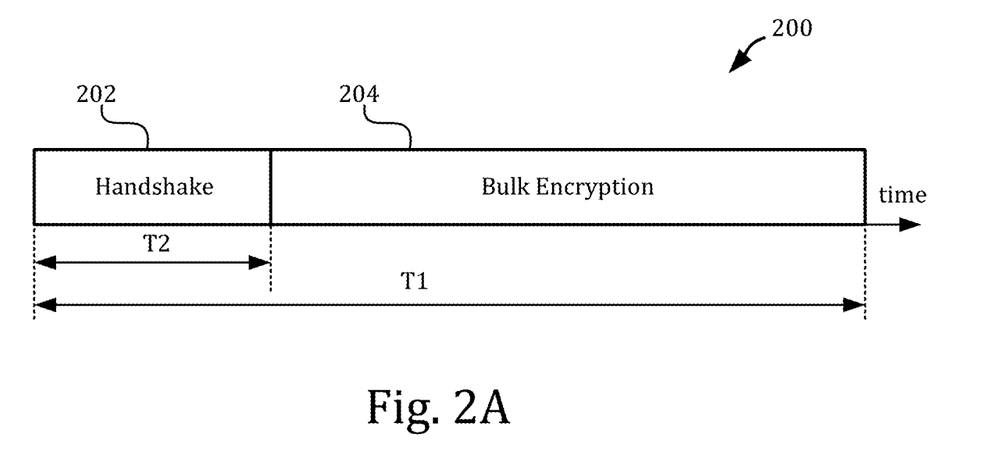
FIG. 2A is a block diagram showing example components of an encrypted communication session.

In some instances, the nodes 102, 104 can communicate with each other on the channel 106 using an encrypted communication session. FIG. 2A is a block diagram showing example components of an encrypted communication session 200. The horizontal axis in FIG. 2A denotes time (e.g., in arbitrary units and scale). The encrypted communication session 200 can be configured according to any secure communications protocol. Example secure communications protocols include Secure Sockets Layer (SSL), Transport Layer Security (TLS), Internet Protocol Security (IPSec), Layer 2 Tunneling Protocol (L2TP), Point-to-Point Tunneling Protocol (PPTP), or any other secure communications protocol. The encrypted communication session 200 includes a handshake portion 202 and a bulk encryption portion 204, where the handshake portion 202 precedes the bulk encryption portion 204. Stated differently, the encrypted communication session 200 starts with a handshake portion 202 and then continues to the bulk encryption portion 204.

In some instances, the handshake portion 202 accomplishes at least the tasks of authenticating the communication endpoints (e.g., nodes 102, 104) and establishing an encryption key (e.g., a symmetric encryption key) that is used for the bulk encryption portion 204. It is in the bulk encryption portion 204 of the encrypted communication session 200 that plaintext data from one of the nodes 102, 104 is encrypted (e.g., using the encryption key established in the handshake portion 202) and transmitted to the other of the nodes 102, 104.

The handshake portion 202 is typically a small fraction of the overall duration T1 of the encrypted communication session 200. For example, the handshake portion 202 may have a duration T2, which in a typical session can be less than 1% of the overall duration T1 of the encrypted communication session 200. Therefore, only a small portion of the encrypted communication session 200 is attributed to authenticating the communication endpoints and establishing an encryption key (e.g., a symmetric encryption key) that is used for the bulk encryption portion 204.

Figure 2B:
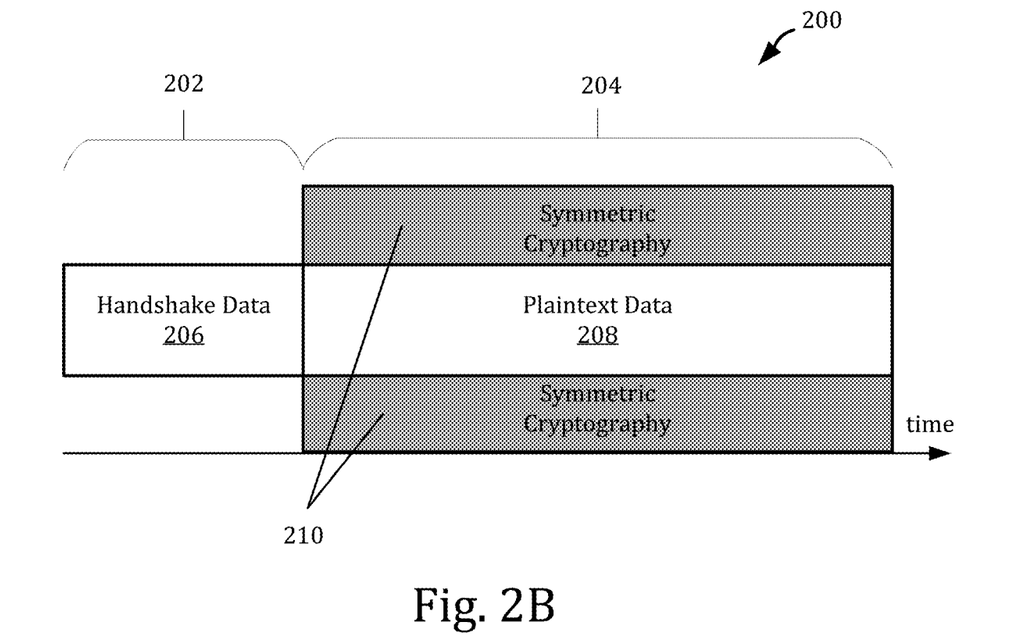
FIG. 2B is a block diagram showing example cryptographic algorithms used in the handshake and bulk encryption portions of the encrypted communication session shown in FIG. 2A.

FIG. 2B is a block diagram showing example cryptographic algorithms used in the handshake and bulk encryption portions of the encrypted communication session 200. The horizontal axis in FIG. 2B denotes time (e.g., in arbitrary units and scale). As seen in the example of FIG. 2B, the handshake portion 202 can include handshake data 206 (e.g., exchanged between nodes 102, 104). In an example where the secure communication session 200 is configured according to the TLS protocol, the handshake data 206 that are exchanged can include one or more of the following: "Hello" messages exchanged between nodes 102, 104 to agree on algorithms, exchange random values, and check for session resumption; cryptographic parameters exchanged between nodes 102, 104 to allow the nodes 102, 104 to agree on a premaster secret; certificates and cryptographic information exchanged between nodes 102, 104 to allow the nodes 102, 104 to authenticate themselves; the master secret generated from the premaster secret; exchanged random values; security parameters provided to the record layer; or the encryption key established for the subsequent bulk encryption portion 204.

At least a portion of the handshake data 206 is exchanged in plaintext. For example, in the TLS protocol (e.g., up to version 1.2), all of handshake data 206 is exchanged in plaintext. The handshake data 206 can include public keys (e.g., for key establishment), signature on those public keys, server (and optionally client) certificate chains (e.g., for authentication), and other parameters. After the handshake portion 202, the encryption is turned on for bulk encryption portion 204. In the IKE and TLS 1.3 protocols, a first portion of the handshake data 206 is not encrypted, but a second portion of the handshake data 206 is encrypted. As an example, public keys (e.g., for key establishment) are exchanged in plaintext, the encryption is turned on, and, subsequently, authentication is performed and other parameters are exchanged. Some protocols may refresh the symmetric encryption keys for the bulk encryption after the encrypted portion of the handshake data 206.

As seen in the example of FIG. 2B, the bulk encryption portion 204 includes plaintext data 208 (e.g., exchanged between nodes 102, 104) that are encrypted using a symmetric cryptographic algorithm 210 (e.g., using a symmetric encryption key established in the handshake portion 202). Example symmetric cryptographic algorithms include the Advanced Encryption Standard (AES), Data Encryption Standard (DES), Triple DES (3DES), and International Data Encryption Algorithm (IDEA) cryptographic algorithms, although other symmetric cryptographic algorithms are possible. In some instances, the symmetric cryptographic algorithm(s) 210 are not vulnerable to quantum-enabled adversaries (e.g., the quantum-enabled adversary 108) when a sufficiently large encryption key is established in the handshake portion 202 and used in the bulk encryption portion 204. As an example, a symmetric encryption key having a length of at least 256 bits may not be vulnerable to quantum-enabled adversaries in some scenarios.

In some instances, an application running on the node 102 may communicate with an application running on the node 104 using the encrypted communication session 200. In some instances, the applications themselves may not support quantum-safe cryptography, such that the handshake and plaintext data 206, 208 are not robust against an attack by the quantum-enabled adversary 108. In such instances, when the applications on the nodes 102, 104 communicate with each other using the encrypted communication session 200, if the handshake portion 202 is exchanged in plaintext or if a portion of it uses a quantum-vulnerable handshake protocol, then the quantum-enabled adversary 108 can compromise the handshake portion 202. By accessing the handshake data 206, the quantum-enabled adversary 108 can obtain the encryption key (e.g., symmetric encryption key) established for the bulk encryption portion 204, thereby compromising the security of the symmetric cryptographic algorithm 210 used in the bulk encryption portion 204 (e.g., since the quantum-enabled adversary 108 can decrypt the encrypted messages using the encryption key and gain access to the plaintext data 208 exchanged between the nodes 102, 104).

Figure 3:
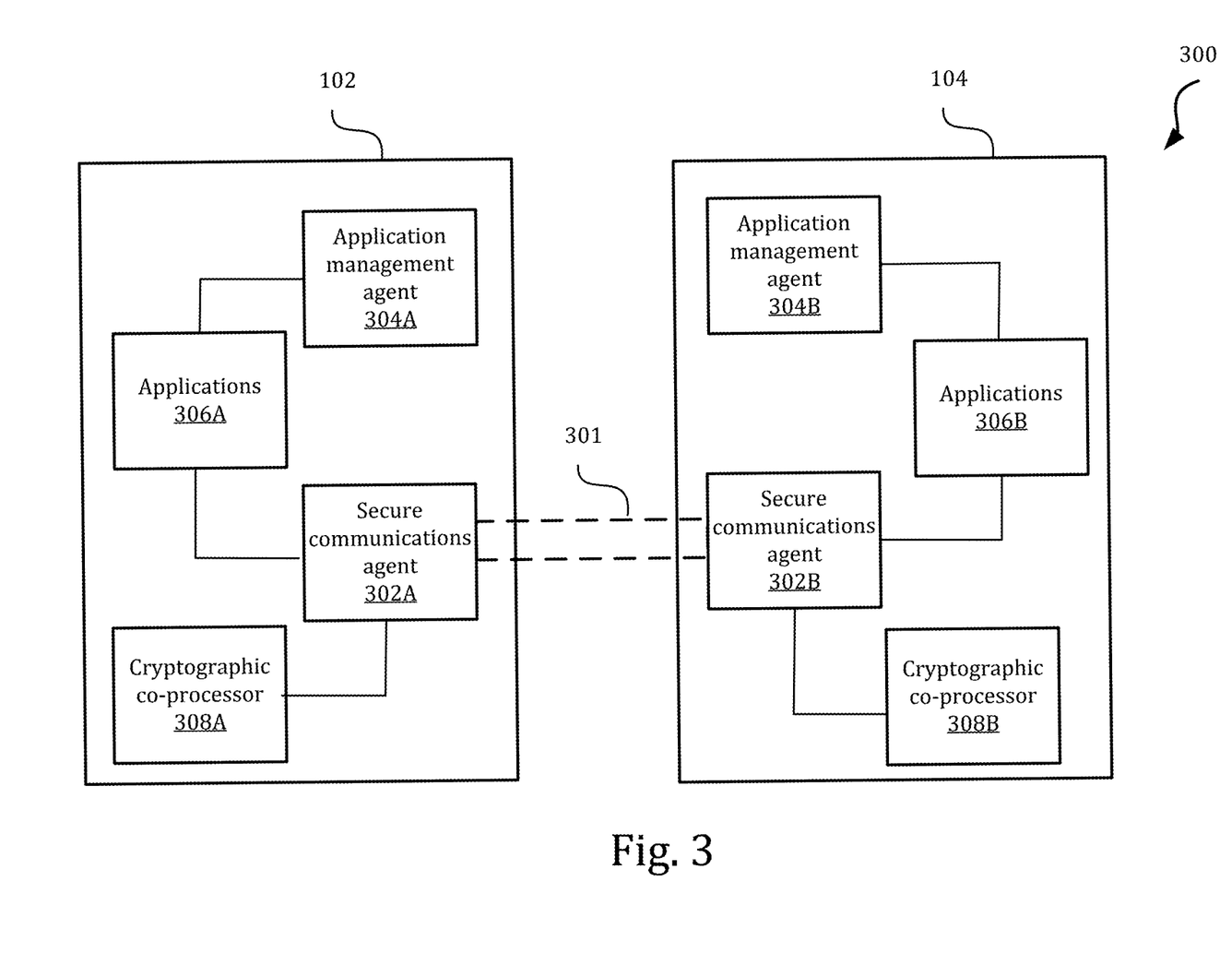
FIG. 3 is a block diagram showing an example system that establishes a quantum-safe communications tunnel between the nodes shown in FIG. 1.

FIG. 3 is a block diagram showing an example system 300 that establishes a quantum-safe communications tunnel 301 between the nodes 102, 104 shown in FIG. 1. As seen in the example shown in FIGS. 2A and 2B, in the secure communication session 200, the handshake portion 202 and the bulk encryption portion 204 use different types of cryptographic algorithms. As discussed above, at least a portion of the handshake data 206 may be exchanged in plaintext and thus is vulnerable to quantum-enabled adversaries (e.g., the quantum-enabled adversary 108). In contrast, the bulk encryption portion 204 uses a symmetric cryptographic algorithm 210 that is secure against a quantum-enabled attack. Consequently, to mitigate threats from the quantum-enabled adversary 108, the system 300 implements an encryption protocol that re-encrypts the handshake data 206 of the encrypted communication session 200 (e.g., since it uses a quantum-vulnerable cryptographic protocol), while the bulk encryption portion 204 of the encrypted communication session 200 is left single-encrypted (e.g., since it already uses a quantum-safe cryptographic protocol). Since only a small portion of the encrypted communication session 200 is re-encrypted, the system 300 has a negligible, almost imperceivable increase in overhead and a similarly negligible, almost imperceivable impact on data throughput.

Figure 4:
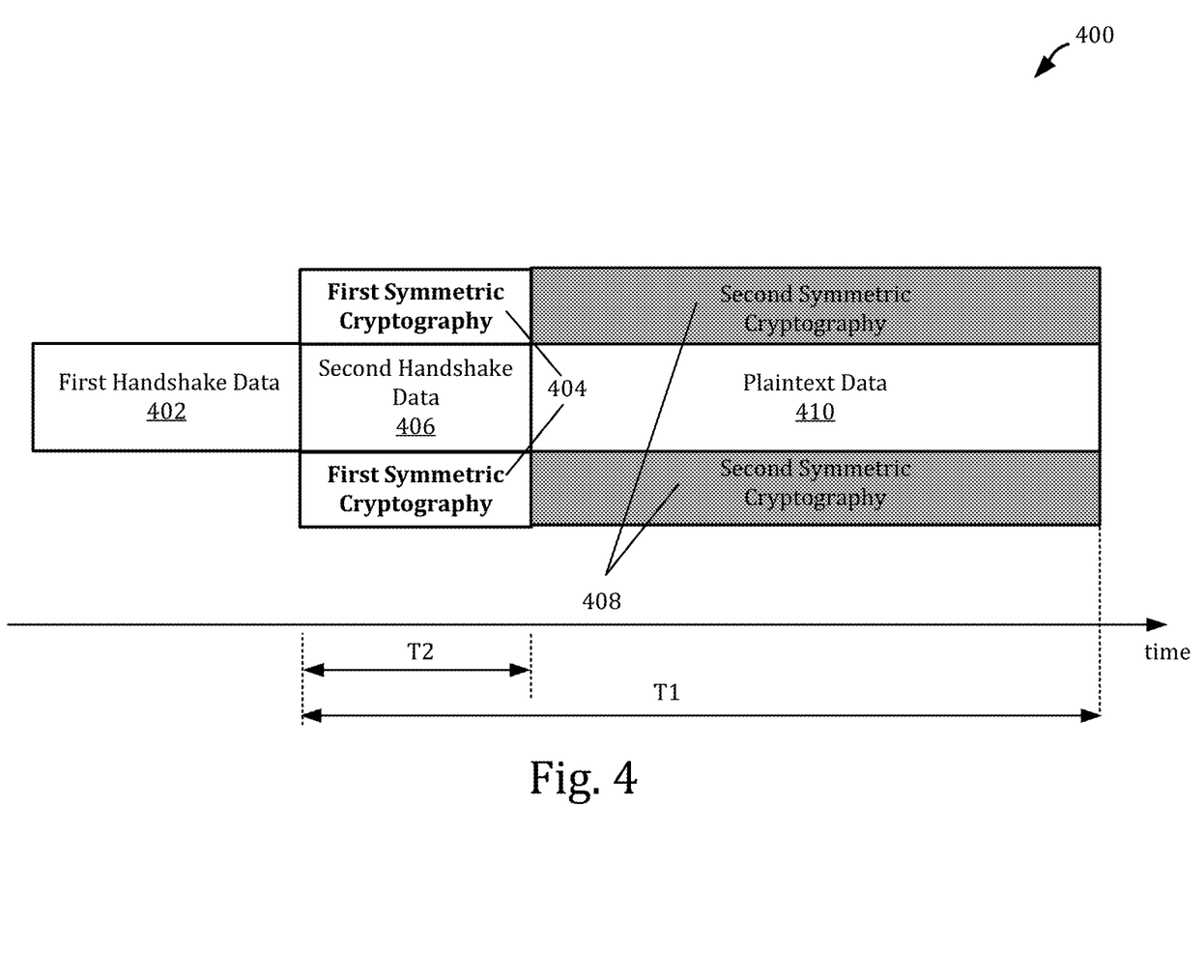
FIG. 4 is a block diagram showing an example encryption protocol used by the system shown in FIG. 3 to establish a quantum-safe communications tunnel.

FIG. 4 is a block diagram showing an example encryption protocol 400 used by the system 300 to establish the quantum-safe communications tunnel 301 shown in FIG. 3. The horizontal axis in FIG. 4 denotes time (e.g., in arbitrary units and scale). As seen in the example shown in FIG. 4, first handshake data 402 is generated and exchanged using a handshake protocol of a quantum-safe cryptographic algorithm. The first handshake data 402 is exchanged between nodes 102, 104 according to the quantum-safe handshake protocol. Example quantum-safe handshake protocols may include supersingular isogeny-based key-establishment algorithms (e.g., Supersingular Isogeny Diffie Hellman (SIDH) key agreement or Supersingular Isogeny Key Encapsulation (SIKE)), lattice-based key-establishment algorithms, code-based key-establishment algorithms, or other quantum-safe key-establishment algorithms.

As seen in the example of FIG. 3, the nodes 102, 104 respectively include secure communications agents 302A, 302B, application management agents 304A, 304B, and applications 306A, 306B. The nodes 102, 104 can also include other components. In some instances, the applications 306A, 306B themselves may not be configured to support or provide quantum-safe cryptography. However, the secure communications agents 302A, 302B may respectively communicate with cryptographic co-processors 308A, 308B. In some instances, the cryptographic co-processors 308A, 308B may be cryptographic co-processors of nodes 102, 104, respectively. Additionally or alternatively, the cryptographic co-processors 308A, 308B may be included in the secure communications agents 302A, 302B.

The secure communications agents 302A, 302B may be configured to support or provide quantum-safe cryptography. Consequently, in some instances, the secure communications agents 302A, 302B may generate the first handshake data 402 with the quantum-safe cryptographic algorithm. Exchange of the quantum-safe first handshake data 402 between the nodes 102, 104 accomplishes at least the tasks of authenticating the communication endpoints (e.g., the secure communications agents 302A, 302B) and establishing an encryption key (e.g., a symmetric encryption key) that is used for a first symmetric cryptographic algorithm 404, which can be a quantum-safe cryptographic algorithm.

As seen in the example shown in FIG. 4, after the quantum-safe first handshake data 402 are exchanged between the nodes 102, 104, second handshake data 406 is generated and exchanged using the first symmetric cryptographic algorithm 404. The encryption key for the first symmetric cryptographic algorithm 404 was established through the exchange of the quantum-safe first handshake data 402 between the nodes 102, 104. The first symmetric cryptographic algorithm 404 is not vulnerable to the quantum-enabled adversary 108.

Referring to the example shown in FIG. 3, in a communication from node 102 to node 104, the application management agent 304A can, for example, control or configure one or more of the applications 306A to generate the second handshake data 406. The application management agent 304A can also control or configure one or more of the applications 306A to provide the second handshake data 406 to the secure communications agent 302A for encryption with the first symmetric cryptographic algorithm 404. The secure communications agent 302A can subsequently transmit the encrypted second handshake data 406 to the node 104 (e.g., to the secure communications agent 302B of the node 104). An analogous process can occur in a communication from node 104 to node 102. Exchange of the quantum-secure encrypted second handshake data 406 accomplishes at least the tasks of authenticating the communication endpoints (e.g., the applications 306A, 306B) and establishing an encryption key (e.g., a symmetric encryption key) that is used for a second symmetric cryptographic algorithm 408.

As seen in the example shown in FIG. 4, after the encrypted second handshake data 406 is exchanged between the nodes 102, 104, plaintext data 410 is encrypted using a second symmetric cryptographic algorithm 408. For example, the first symmetric cryptography algorithm 404 can be suspended or terminated (turned off), while the second symmetric cryptography algorithm 408 is applied (kept on) for the remaining duration of the secure communication between the nodes 102, 104. Thus, single-encrypted data is communicated between the nodes 102, 104 after the second handshake data 406 (after the end of the T2 time period). The second symmetric cryptographic algorithm 408 is not vulnerable to the quantum-enabled adversary 108 (e.g., when a sufficiently large encryption key is established by the second handshake data 406). As seen in the example of FIG. 3, in communicating plaintext data 410 from node 102 to node 104, the application management agent 304A can, for example, control or configure one or more of the applications 306A to generate the plaintext data 410 and encrypt the plaintext data 410 using the second symmetric cryptographic algorithm 408. The encryption key for the second symmetric cryptographic algorithm 408 was established through the exchange of the encrypted second handshake data 406 between the nodes 102, 104. The application management agent 304A can also control or configure one or more of the applications 306A to provide the encrypted plaintext data 410 to the secure communications agent 302A for transmission to the node 104 (e.g., to the secure communications agent 302B of the node 104). An analogous process can occur in a communication from node 104 to node 102.

As seen in the example of FIG. 4, the plaintext data 410 is not double encrypted, and is instead encrypted once (single-encrypted) using the second symmetric cryptographic algorithm 408. Consequently, in using the example encryption protocol 400, the system 300 only re-encrypts the handshake portion of the primary encryption communication session (here, the primary session is the communication session that spans the duration T1 shown in FIG. 4). Thus, the example encryption protocol 400 protects the vulnerable handshake messages (e.g., the second handshake data 406), while refraining from unnecessarily re-encrypting information already encrypted using a quantum-resistant symmetric algorithm (e.g., plaintext data 410 already encrypted with quantum-safe second symmetric cryptographic algorithm 408). Since the handshake portion of the primary encryption communication session (e.g., the handshake portion that spans the duration T2 shown in FIG. 4) is typically only a very small portion of the primary encryption communication session, re-encrypting the second handshake data 406 has a negligible (almost imperceivable) impact on data throughput. Furthermore, when the nodes 102, 104 shown in the system 300 have intermittent sessions, the encryption key (e.g., symmetric encryption key) negotiated using the quantum-safe first handshake data can be reused.

Figure 5:
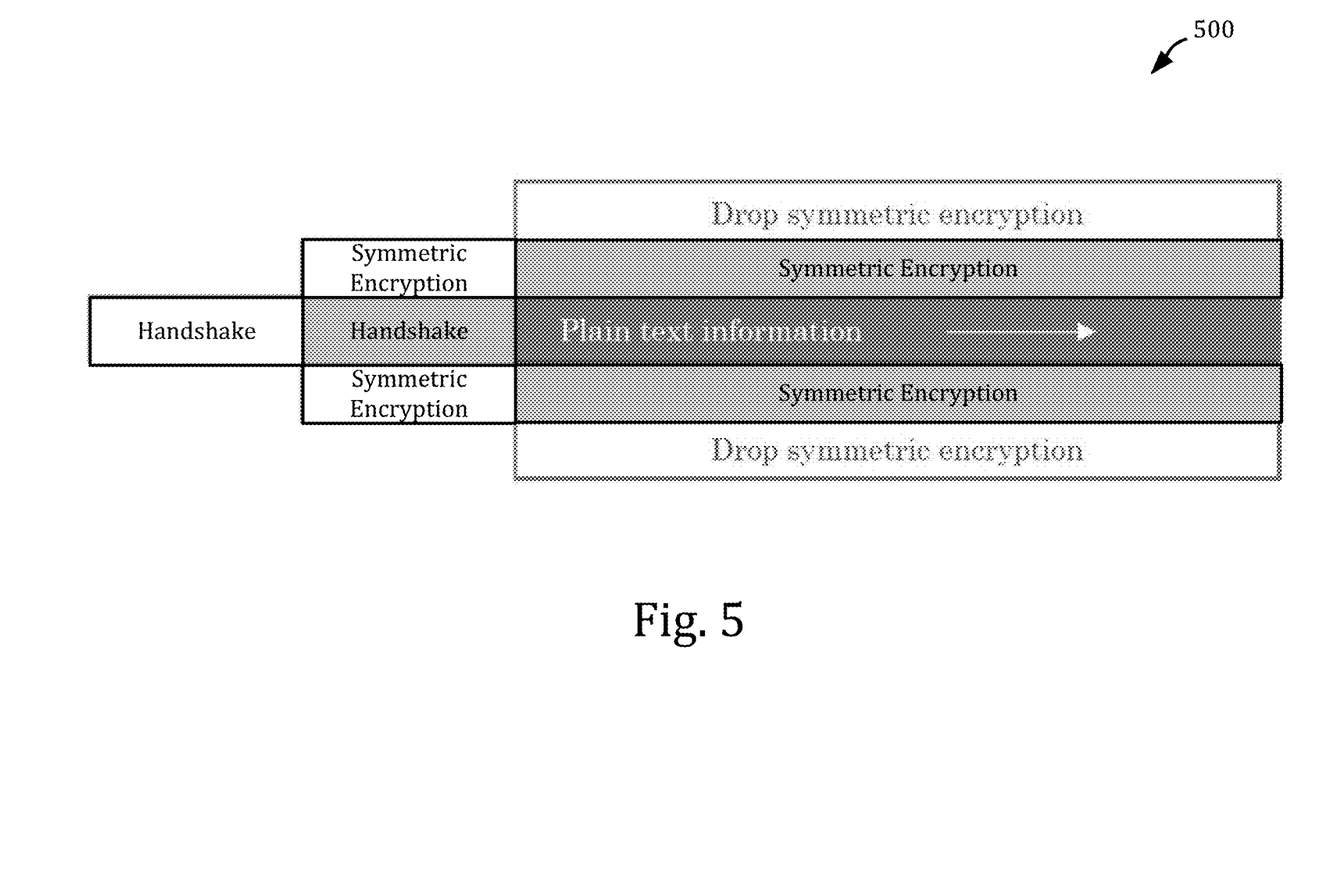
FIG. 5 is a block diagram showing an example encryption protocol.

FIG. 5 is a block diagram showing an example encryption protocol 500. As seen in the example of FIG. 5, only the handshake part of the primary encryption session (the inner pipe shown in FIG. 5) is encrypted. Here, the vulnerable handshake messages are protected. Additionally, information already encrypted using a quantum-resistant symmetric algorithm are not unnecessarily re-encrypted. Because the handshake is so much smaller than the bulk encryption proportionally, re-encrypting the handshake should have negligible (almost imperceivable) impact on throughput. Additionally, when two peers have intermittent sessions, the symmetric re-encryption keys negotiated using the quantum-resistant mechanisms (e.g., the outer pipe shown in FIG. 5) can be reused.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, an additional layer of encryption is provided for handshake data without significantly adversely impacting information transmission throughput. In some aspects of the examples described here, only the vulnerable parts of the communication session (e.g., a handshake protocol) are encrypted using strong algorithms.

In a first example, a cryptography method for encrypted communication between a first entity and a second entity is provided. The method includes executing, by operation of a first computing device associated with a first entity, a first handshake process with a second entity according to a first handshake protocol to establish a first symmetric encryption key for a first encryption protocol. The method also includes executing, by operation of the first computing device associated with the first entity, a second handshake process with the second entity to establish a second symmetric encryption key for a second encryption protocol. Executing the second handshake process includes: generating second handshake data according to a second handshake protocol; encrypting the second handshake data using the first symmetric encryption key with the first encryption protocol; and sending the encrypted second handshake data to a second computing device associated with the second entity. The method further includes using the second symmetric encryption key and the second encryption protocol for single-encrypted communication over a communication channel between the first and second entities.

Implementations of the first example may include one or more of the following features. The first handshake protocol is a quantum-safe handshake protocol. The second handshake protocol is a quantum-vulnerable handshake protocol, and the first encryption protocol that is used to encrypt the second handshake data is a quantum-safe encryption protocol. The first and second encryption protocols are quantum-safe symmetric key encryption protocols. Each of the first and second symmetric encryption keys have a length of 256 bits. The method of the first example further includes, after completing the second handshake process, terminating use of the first encryption protocol for bulk communication between the first and second entities.

In a second example, a computing system includes a first computing device associated with a first entity; and the first computing device includes one or more processors and memory storing instructions that are operable when executed by the one or more processors to perform one or more operations of the first example.

In a third example, a computer-readable medium stores instructions that are operable when executed by a data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A cryptography method for encrypted communication between a first entity and a second entity, the method comprising:
   by operation of a first computing device associated with the first entity, executing a first handshake process with the second entity according to a first handshake protocol, wherein the first handshake process establishes a first symmetric encryption key for a first encryption protocol;
   by operation of the first computing device associated with the first entity, executing a second handshake process with the second entity to establish a second symmetric encryption key for a second encryption protocol, wherein executing the second handshake process comprises:
     generating second handshake data according to a second handshake protocol;
     encrypting the second handshake data using the first symmetric encryption key with the first encryption protocol; and
     sending the encrypted second handshake data to a second computing device associated with the second entity; and using the second symmetric encryption key and the second encryption protocol for single-encrypted communication over a communication channel between the first and second entities.

2. The method of claim 1, wherein the first handshake protocol is a quantum-safe handshake protocol.

3. The method of claim 2, wherein the second handshake protocol is a quantum-vulnerable handshake protocol, and the first encryption protocol that is used to encrypt the second handshake data is a quantum-safe encryption protocol.

4. The method of claim 1, wherein the first and second encryption protocols are quantum-safe symmetric key encryption protocols.

5. The method of claim 1, wherein each of the first and second symmetric encryption keys have a length of 256 bits.

6. The method of claim 1, comprising, after completing the second handshake process, terminating use of the first encryption protocol for bulk communication between the first and second entities.

7. A computing system comprising a first computing device associated with a first entity, the first computing device comprising:
 one or more processors; and
 memory storing instructions that are operable when executed by the one or more processors to perform one or more operations comprising:
  executing a first handshake process with the second entity according to a first handshake protocol, wherein the first handshake process establishes a first symmetric encryption key for a first encryption protocol;
  executing a second handshake process with the second entity to establish a second symmetric encryption key for a second encryption protocol, wherein executing the second handshake process comprises:
   generating second handshake data according to a second handshake protocol;
   encrypting the second handshake data using the first symmetric encryption key with the first encryption protocol; and
   sending the encrypted second handshake data to a second computing device associated with the second entity; and
  using the second symmetric encryption key and the second encryption protocol for single-encrypted communication over a communication channel between the first and second entities.

8. The computing system of claim 7, wherein the first handshake protocol is a quantum-safe handshake protocol.

9. The computing system of claim 8, wherein the second handshake protocol is a quantum-vulnerable handshake protocol, and the first encryption protocol that is used to encrypt the second handshake data is a quantum-safe encryption protocol.

10. The computing system of claim 7, wherein the first and second encryption protocols are quantum-safe symmetric key encryption protocols.

11. The computing system of claim 7, wherein each of the first and second symmetric encryption keys have a length of 256 bits.

12. The computing system of claim 7, wherein the operations further comprise after completing the second handshake process, terminating use of the first encryption protocol for bulk communication between the first and second entities.

13. The computing system of claim 7, comprising the second computing device.

14. A non-transitory computer-readable medium storing instructions that are operable when executed by data processing apparatus associated with a first entity to perform operations comprising:
 executing a first handshake process with a second entity according to a first handshake protocol, wherein the first handshake process establishes a first symmetric encryption key for a first encryption protocol;
 executing a second handshake process with the second entity to establish a second symmetric encryption key for a second encryption protocol, wherein executing the second handshake process comprises:
  generating second handshake data according to a second handshake protocol;
  encrypting the second handshake data using the first symmetric encryption key with the first encryption protocol; and
  sending the encrypted second handshake data to a computing device associated with the second entity; and
 using the second symmetric encryption key and the second encryption protocol for single-encrypted communication over a communication channel between the first and second entities.

15. The non-transitory computer-readable medium of claim 13, wherein the first handshake protocol is a quantum-safe handshake protocol.

16. The non-transitory computer-readable medium of claim 14, wherein the second handshake protocol is a quantum-vulnerable handshake protocol, and the first encryption protocol that is used to encrypt the second handshake data is a quantum-safe encryption protocol.

17. The non-transitory computer-readable medium of claim 13, wherein the first and second encryption protocols are quantum-safe symmetric key encryption protocols.

18. The non-transitory computer-readable medium of claim 13, wherein each of the first and second symmetric encryption keys have a length of 256 bits.

19. The non-transitory computer-readable medium of claim 13, wherein the operations further comprise after completing the second handshake process, terminating use of the first encryption protocol for bulk communication between the first and second entities.

* * * * *